C. L. DELAPLAIN.
ROTARY HOE.
APPLICATION FILED JAN. 13, 1917.
1,270,710.
Patented June 25, 1918.
2 SHEETS—SHEET 1.
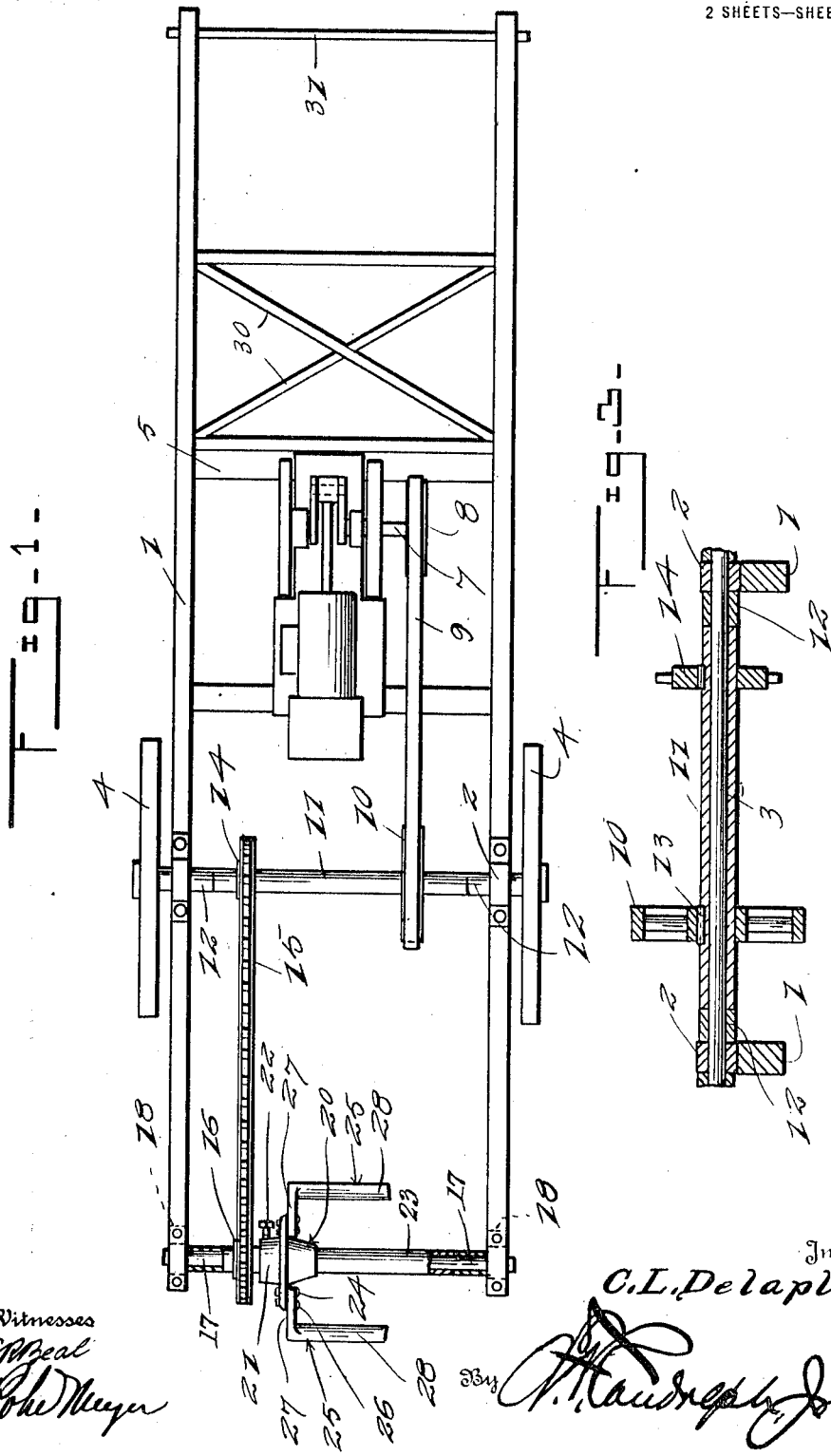
Witnesses
CR Beal
Rohr Meyer
Inventor
C. L. Delaplain,
By
Attorney

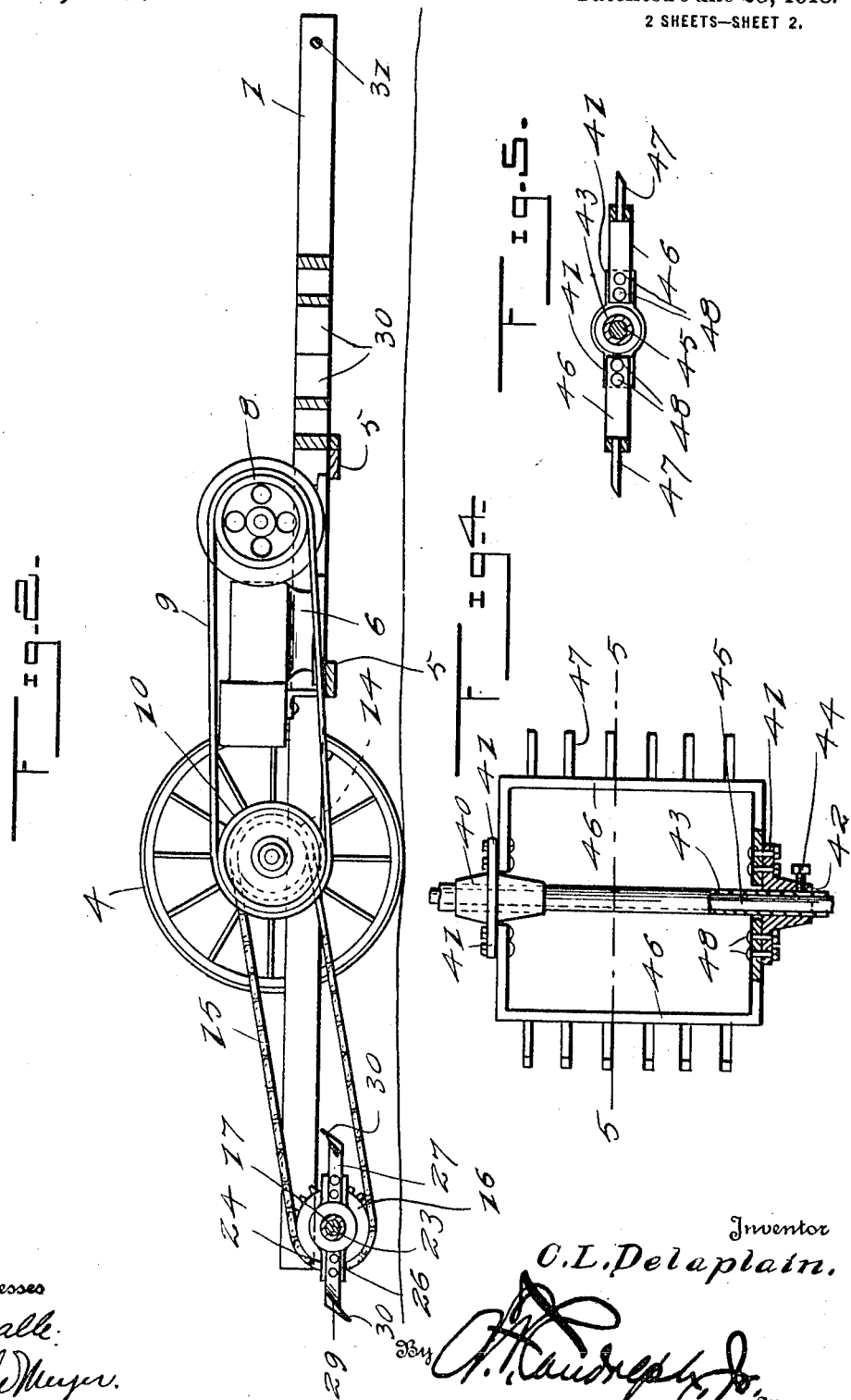

UNITED STATES PATENT OFFICE.

CARL L. DELAPLAIN, OF MANSFIELD, ARKANSAS.

ROTARY HOE.

1,270,710.   Specification of Letters Patent.   Patented June 25, 1918.

Application filed January 13, 1917. Serial No. 142,131.

*To all whom it may concern:*

Be it known that I, CARL L. DELAPLAIN, a citizen of the United States, residing at Mansfield, in the county of Sebastian and State of Arkansas, have invented certain new and useful Improvements in Rotary Hoes; and I do hereby declare the following to be a full, clear, and exact description of the invention, such as will enable others skilled in the art to which it appertains to make and use the same.

This invention relates to an agricultural implement, and more particularly to a rotary hoe which is supported by a suitable portable frame so that it may be easily pushed over a field for the purpose of cutting weeds out of growing grain or analogous agricultural products and further to provide a motor for rotating the hoe.

Another object of this invention is to provide a portable rotary hoe structure as specified which includes a supporting frame having a supporting axle rotatably carried thereby, upon the ends of which are rotatably mounted supporting wheels, and to mount a sleeve about a portion of the axle, which sleeve is operatively connected to the prime mover and to the rotary hoe.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 1 is a top plan view of the improved rotary hoe.

Fig. 2 is a side elevation of the hoe.

Fig. 3 is a fragmentary view in section illustrating the axle and the manner of mounting the hoe propelling sleeve thereon.

Fig. 4 is a detail view partially in section of a modified form of the implement used by the hoe structure, and Fig. 5 is a section on the line 5—5 of Fig. 4.

Referring more particularly to the drawings, 1 designates the supporting frame of the rotary hoe structure, which supporting frame has bearings 2 carried thereby which support the main supporting axle 3 of the hoe structure. Supporting wheels 4 are mounted upon the outer spindle ends of the axle 3 intermediate the ends of the frame 1 as clearly shown in Figs. 1 and 2 of the drawings.

The frame 1 has a pair of cross braces 5 carried thereby forwardly of the axle 3, which cross braces support a prime mover, such as an internal combustion engine or the like 6. The crank shaft 7 of the prime mover 6 has a pulley 8 mounted thereon about which a belt 9 passes. The belt 9 also passes about a pulley 10 which is mounted upon a sleeve 11. The sleeve 11 is loosely mounted upon the axle 3 and is held against longitudinal movement by spacing collars 12. The pulley 10 is keyed upon a frame 11 as illustrated at 13. A sprocket 14 is also keyed upon the sleeve 11 and a sprocket chain 15 passes about the sprocket 14 and about a sprocket 16 which is mounted upon the hoe propelling shaft 17. The hoe propelling shaft 17 extends transversely across the end of the frame 1 and it has its ends rotatably seated in bearings 18, so that the shaft 17 may be disconnected from the frame 1 if desired, for replacing the hoe structure. The hoe structure which is generically indicated by the numeral 20 comprises a hub 21 which is mounted upon a sleeve 23 and is held in place thereon by a set screw 22. The sleeve 23 is mounted upon the shaft 17 and the sprocket 14 is carried by this sleeve.

The hub 21 has an annular plate 24 formed thereon, to which the hoe blades 25 are attached, in any suitable manner such as by bolts or rivets as indicated at 26. The blades 25 have attaching arms 27 and cutting blades 28, which cutting blades are disposed at substantially right angles to the attaching arm 27, and have their inner edges tapering as illustrated at 29 in Fig. 2 of the drawings for providing a cutting edge 30 which will cut weeds, or the like.

The frame 1 is braced by cross braces 30, and it has a handle 31 attached to the end of the frame remote from the shaft 23 or at the back end of the frame which handle is provided for facilitating the pushing of the rotary hoe structure over the ground.

In Figs. 4 and 5 of the drawings, a modified form of rotor is illustrated, which modified form comprises hubs 40 which are identical in construction to the hubs 21, having annular flanges 41 formed thereon and held upon the sleeves 43 by means of a set screw 44. The sleeve 43 is mounted upon a shaft 45.

In the modified form of rotors, two of the hub members are employed and they have a pair of substantially U-shaped bars 46 connected thereto, to the bight portions of which bars are attached a plurality of harrowing or cultivating teeth 47 which will tear up and pulverize or loosen the ground during the rotation of the rotor. The legs of the substantially U-shaped bars 46 are attached to the flanges 41 in any suitable manner such as by rivets or bolts as indicated at 48.

From the foregoing description taken in connection with the accompanying drawings, the advantages of construction and of the method of operation of the improved rotary hoe will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:

In a rotary hoe structure, a supporting frame, an axle carried by said frame, a sleeve rotatably mounted upon said axle, a shaft carried by one end of said frame, a sleeve rotatably mounted upon said shaft, a rotary earth working tool adjustably mounted upon said shaft carried sleeve for rotation therewith, a prime mover, means connecting said prime mover and said axle carried sleeve, means connecting said axle carried sleeve and said shaft carried sleeve, a handle carried by the frame at the end opposite to said shaft, said prime mover and rotary earth working tool positioned upon opposite sides of said axle for substantially balancing said frame upon said axle.

CARL L. DELAPLAIN.

Witnesses:
ANNA E. DELAPLAIN,
J. F. DICKSON.

Copies of this patent may be obtained for five cents each, by addressing the "Commissioner of Patents, Washington, D. C."